United States Patent
Ishimatsu

(10) Patent No.: US 11,245,844 B2
(45) Date of Patent: Feb. 8, 2022

(54) PROCESSING APPARATUS, IMAGING APPARATUS, AND IMAGING SYSTEM

(71) Applicant: CANON KABUSHIKI KAISHA, Tokyo (JP)

(72) Inventor: Rie Ishimatsu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/797,503

(22) Filed: Feb. 21, 2020

(65) Prior Publication Data
US 2020/0280676 A1 Sep. 3, 2020

(30) Foreign Application Priority Data
Feb. 28, 2019 (JP) .............................. JP2019-036133

(51) Int. Cl.
*H04N 5/232* (2006.01)
*H04N 1/21* (2006.01)

(52) U.S. Cl.
CPC ....... *H04N 5/23229* (2013.01); *H04N 1/2112* (2013.01)

(58) Field of Classification Search
CPC ............. H04N 5/23229; H04N 1/2112; H04N 5/23206; H04N 5/2258; H04N 5/247; H04N 5/2254; H04N 5/238
See application file for complete search history.

(56) References Cited

U.S. PATENT DOCUMENTS

| | | | |
|---|---|---|---|
| 10,095,010 B2 | 10/2018 | Takemoto | |
| 10,386,649 B2 | 8/2019 | Yamaguchi | |
| 2009/0079982 A1 | 3/2009 | Lefaudeux | |
| 2012/0201462 A1* | 8/2012 | Chang | H04N 19/147 382/190 |
| 2016/0231582 A1* | 8/2016 | Yamaguchi | G02B 27/286 |
| 2016/0370688 A1* | 12/2016 | Ishimatsu | G02B 27/286 |
| 2018/0292627 A1 | 10/2018 | Takemoto | |

FOREIGN PATENT DOCUMENTS

| | | |
|---|---|---|
| JP | 2016145924 A | 8/2016 |
| JP | 2018025624 A | 2/2018 |
| JP | 2018180203 A | 11/2018 |
| JP | 2019008088 A | 1/2019 |

OTHER PUBLICATIONS

"Compressing many similar large images?", Apr. 2018, retrieved from https://superuser.com/questions/1311850/compressing-many-similar-large-images on Jan. 30, 2021 (Year: 2018).*

* cited by examiner

Primary Examiner — Timothy J Henn
(74) Attorney, Agent, or Firm — Rossi, Kimms & McDowell LLP

(57) ABSTRACT

A processing apparatus configured to obtain polarization information using a plurality of images each of which is obtained in a different polarization state of light from an object includes a processor configured to select one reference image from the plurality of images and to generate difference data relating to a difference between the reference image and an image other than the reference image, and a recorder configured to record the reference image and the difference data.

18 Claims, 5 Drawing Sheets

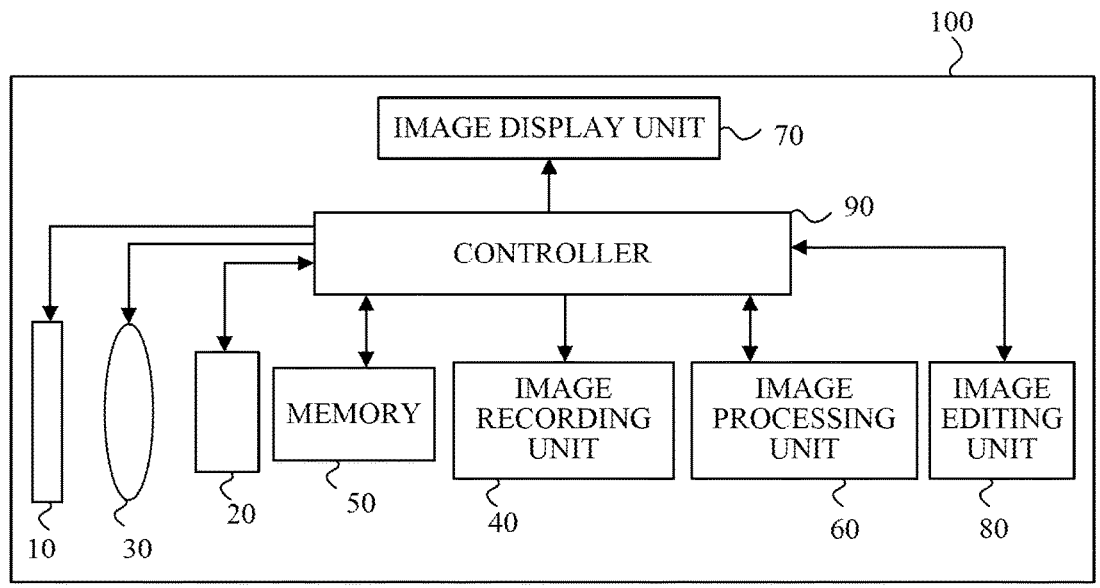
FIG. 1
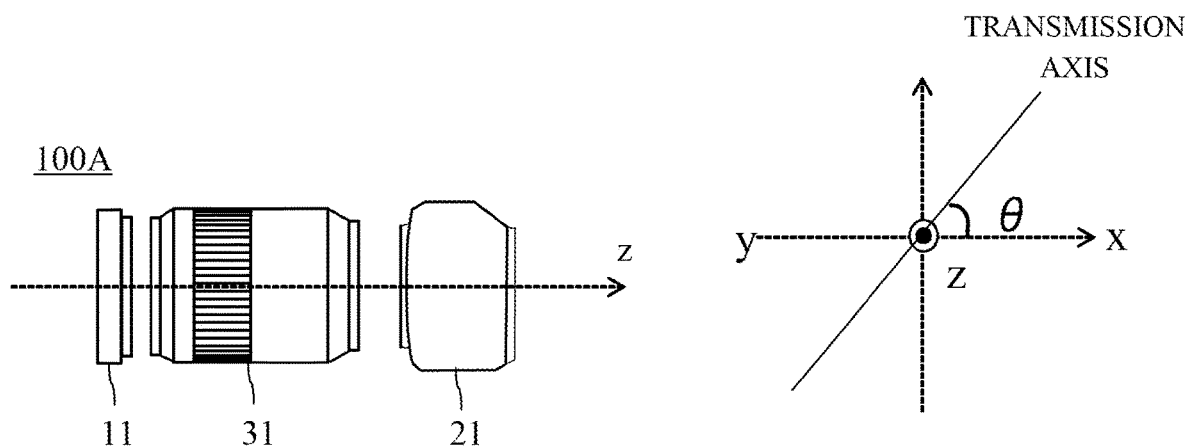
FIG. 2A
FIG. 2B

PROCESSING APPARATUS, IMAGING APPARATUS, AND IMAGING SYSTEM

BACKGROUND OF THE INVENTION

Field of the Invention

The present invention relates to a processing apparatus, an imaging apparatus, and an imaging system, each of which obtains polarization information using a plurality of images each of which is obtained in a different polarization state of light from an object.

Description of the Related Art

One conventionally known method emphasizes or reduces a predetermined feature in an image of an object by obtaining a polarization state of light from the object. For example, a polarization filter (polarization plate) attached to a front surface of a lens of an imaging apparatus and used to capture an image of an object can emphasize a texture of the object in the image, such as a color and a contrast, and emphasize or reduce reflected light.

U.S. Patent Application Publication No. ("US") 2009/0079982 and Japanese Patent Application Laid-Open No. ("JP") 2016-145924 disclose a method for obtaining polarization information of an object by imaging the object a plurality of times while changing a phase difference by applying voltage to a liquid crystal variable phase plate (or retardation plate).

However, the method disclosed in US 2009/0079982 and JP 2016-145924 require the plurality of images of the object in order to obtain polarization information. Thus, an image data amount increases and processing speed decreases.

SUMMARY OF THE INVENTION

The present invention provides a processing apparatus, an imaging apparatus, and an imaging system, each of which can reduce a data amount of a plurality of images obtained in different polarization state of light from an object.

The present invention provides a processing apparatus configured to obtain polarization information using a plurality of images each of which is obtained in a different polarization state of light from an object, including a processor configured to select one reference image from the plurality of images and to generate difference data relating to a difference between the reference image and an image other than the reference image, and a recorder configured to record the reference image and the difference data.

An imaging apparatus and an imaging system as one aspect of the present invention including the above processing apparatus also constitute another aspect of the present invention.

Further features of the present invention will become apparent from the following description of exemplary embodiments with reference to the attached drawings.

BRIEF DESCRIPTION OF THE DRAWINGS

FIG. 1 is a schematic diagram of an imaging system according to embodiments of the present invention.

FIG. 2A is a schematic diagram of an imaging system according to a first embodiment.

FIG. 2B illustrates a coordinate system of a transmission axis.

DESCRIPTION OF THE EMBODIMENTS

Figure 3:
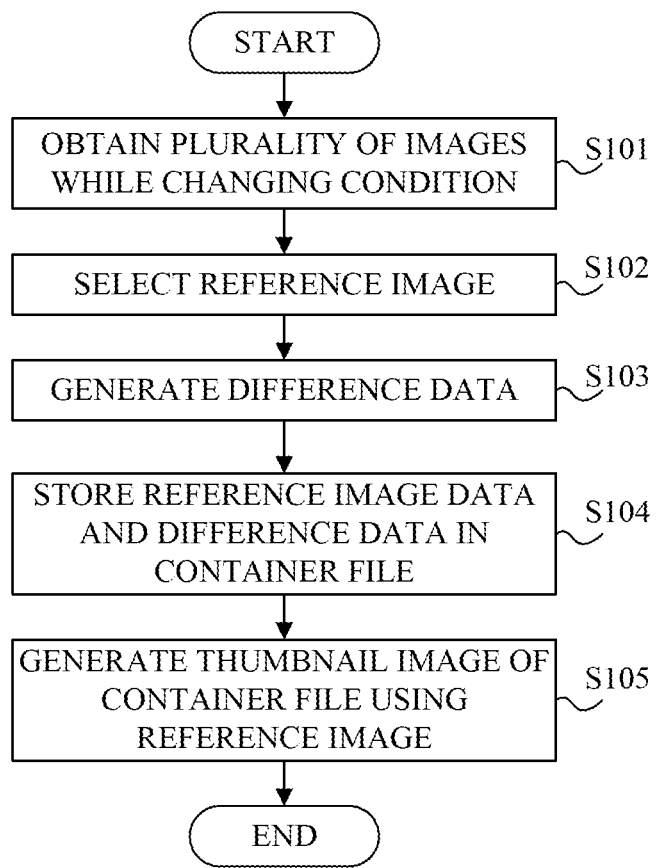
FIG. 3 is a flowchart describing a data recording method according to the first embodiment.

Referring now to the accompanying drawings, a detailed description will be given in detail of embodiments according to the present invention. Corresponding elements in respective figures will be designated by the same reference numerals, and a duplicate description thereof will be omitted.

FIG. 1 is a schematic diagram of an imaging system 100 according to one embodiment of the present invention. An imaging system 100 includes a polarization unit (polarizer) 10, an image sensor 20, an imaging optical system 30, an image recording unit (recorder) 40, an image processing unit (processor) 60, and a controller 90. Light from an object passes through the polarization unit 10 and the imaging optical system 30, and forms an image on an imaging plane of the image sensor 20. The imaged light is converted into an electrical signal by the image sensor 20 and read out as digital data (image data). The image recording unit 40 records the image data. The image processing unit 60 has a function of obtaining polarization information from a plurality of images. The controller 90 is configured to control each component in the imaging system 100.

The imaging system 100 may include a memory 50 and an image display unit 70. In this case, the memory 50 temporarily records the image data that has been read out of the image sensor 20. The image processing unit 60 processes the image data and then the image recording unit 40 records or the display unit 70 displays the image data.

The imaging system 100 may include an image editing unit (image processor) 80. The image editing unit 80 edits an image based on the image data recorded on the image recording unit 40 or the image data temporarily recorded on the memory 50. The image editing unit 80 can generate a polarized image.

A description will now be given of an acquisition of polarization information, an image recording method, and a reference image selecting method in the imaging system 100.

Acquisition of Polarization Information

The imaging system 100 obtains polarization information by capturing the light from the object while changing the polarization state. This embodiment uses the polarization unit 10 for obtaining the polarization information. The polarization unit 10 is disposed on an optical path of the imaging system 100 (between the object and the imaging apparatus 20) and has a function of controlling the polarization state of transmitting light. When the controller 90 controls a transmission polarization state of the polarization unit 10 during imaging, a plurality of images (captured images) can be obtained in a different polarization state, and the image processing unit 60 can obtain the polarization information from the plurality of images.

The number of images to be obtained is two or more, or may be three or more. Obtaining two images provides information on a luminance difference and a luminance ratio of two polarization states. Obtaining three or more images provides further information such as a degree of linear polarization and a polarization angle.

Reference Image Selecting Method

The image processing unit 60 selects one reference image (single reference image) from the obtained plurality of images. A method for selecting the reference image is not particularly limited. For example, a reference polarization state may be set to a state in which linearly polarized light vibrating in a vertical direction relative to the ground is transmitted, and an image captured in or closest to the reference polarization state may be selected as a reference image. Since an image captured in the reference polarization state can always provide a P-polarized light component relative to the ground, an image with a low luminance value, in which reflected light from the ground or a plane parallel to the ground is suppressed, could be set to the reference image. A first captured image may be selected as the reference image. An image having the lowest luminance may be selected. An image captured in a polarization state that is set when an imaging condition (such as a focus position, a shutter speed, an F-number (aperture value), and ISO) is determined may be selected.

Image Recording

The image processing unit 60 generates difference data between an image other than the reference image and the reference image. The image recording unit 40 records the reference image data and the difference data. These data may be recorded on the cloud. Recording of the difference data would save a recording capacity. When the polarization information is to be obtained, an object image is continuously captured while the polarization state changes and therefore a composition variation in the object is small. Thus, recording of difference data saves a large recorded capacity.

The color and the brightness of the object change due to a change in the polarization state, and the change in the image due to the polarization state can be obtained from the difference data. A proper setting of the polarization state during imaging makes it possible to obtain desired polarization information as difference data.

The reference image data and the difference data may be recorded on one file generated in the image recording unit 40. Thereby, the reference image data and the difference data would be recorded in association with each other. Furthermore, a small number of files can make a desired file to be easily found even when a lot of objects are imaged.

When the reference image data and the difference data are recorded on one file, a thumbnail image may be generated based on the reference image for further improvement in a visibility of the file. Thereby, a user can easily find the desired file without opening the file.

First Embodiment

FIG. 2A is a schematic diagram of an imaging system 100A in this embodiment. FIG. 2B is a diagram illustrating a coordinate system of a transmission axis. The imaging system 100A includes a polarization accessory 11, a single-lens camera 21, and an interchangeable lens 31. The polarization accessory 11 is an element configured to control the polarization state of the transmitting light. In this embodiment, the polarization accessory 11 has a polarization filter and a function of rotationally controlling the polarization filter. The single-lens camera 21 includes an image sensor, a memory, an image recording unit, an image processing unit, a controller, and an operation unit. The controller controls the polarization accessory 11, the single-lens camera 21, and the interchangeable lens 31. The user sets various settings and operates the single-lens camera 21 via the operation unit.

Referring now to FIG. 3, a description will be given of a data recording method in this embodiment that is executed by the controller. FIG. 3 is a flowchart describing the data recording method according to this embodiment. The flow starts when the user sets a polarization acquisition mode to the single-lens camera 21 and presses a release button in the operation unit.

In the step S101, the controller rotates the polarization filter of the polarization accessory 11, and make the single-lens camera 21 capture a plurality of images in transmission axis angles different from each other. A memory in the single-lens camera 21 records a plurality of captured image.

This embodiment sequentially sets the angle of the transmission axis of the polarization filter to 0°, 45°, 90°, and 135°, and obtains four images. In this embodiment, the transmission axis angle is defined as an angle θ that is formed between the transmission axis and the x axis, as illustrated in FIG. 2B. The z-axis in FIG. 2B coincides with an optical axis of the interchangeable lens 31 and, of two components orthogonal to each other in the plane orthogonal to the z-axis, a direction parallel to the ground is set to an x-axis and a direction orthogonal to the x-axis is set to a y-axis. The transmission axis angle θ is defined as an angle that is obtained by subtracting 180° when the angle is 180° or more and less than 360° since the states of 0° and 180° are the same.

In the step S102, the controller makes the image processing unit select one reference image from four images recorded on the memory in the step S101. In this embodiment, the image processing unit selects the first captured image (an image obtained in a transmission axis at 0°) as the reference image.

In the step S103, the controller makes the image processing unit generate difference data between an image other than the reference image and the reference image.

In the step S104, the controller records the reference image data and three pieces of difference data on one container file in the image recording unit.

In the step S105, the controller makes the image processing unit generate a thumbnail image of the container file using the reference image, and records the thumbnail image in the same file as the reference image data and the difference data.

The steps S103 and S104 are completely separated in FIG. 3, but parallel processing may be performed. That is, this embodiment records the difference data after the difference data of all the images are generated, but the generation and the recording of the difference data may alternate for each image. In that case, since the difference data recording and the difference data generation for the next image would be partially performed in parallel, the time required for the entire processing would be reduced.

A format of the data recording is not particularly limited, and the data may be recorded, for example, according to a recording format that is set in advance in the single-lens camera 21. If the user does not specify the data format in advance, recording may be performed according to the initial setting recorded on the single-lens camera 21.

This embodiment does not record image data other than the reference image. That is, the image data other than the reference image is deleted. However, when the setting where all the images can be recorded is turned on, all the images may be recorded.

This embodiment sets the transmission axis angle to 0°, 45°, 90°, and 135° for obtaining the images, but the present invention is not limited to this embodiment and can arbitrarily set it. Various changes can be made according to the required polarization information.

Figure 4:
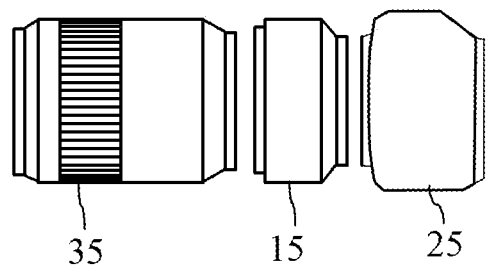
FIG. 4 is a schematic diagram of another imaging system according to the first embodiment.

FIG. 4 is a schematic diagram of another imaging system 100B according to this embodiment. The imaging system 100B includes a polarization accessory 15, a single-lens camera 25, and an interchangeable lens 35. A description will be given of differences from the imaging system 100A illustrated in FIGS. 2A and 2B.

The polarization accessory 15 is a polarization unit using a liquid crystal variable phase plate, and can control the transmission axis angle through the voltage driving of the liquid crystal variable phase plate.

The polarization accessory 15 may include a quarter waveplate, two liquid crystal variable phase plates, and a polarization plate. The liquid crystal variable phase plate rotates liquid crystal molecules in an element plane by applying voltage, and controls the phase difference amount given to the light that has passed through elements disposed in front of the liquid crystal variable phase plate.

The polarization accessory 15 may be composed of a ¼λ plate, one liquid crystal variable phase plate, and a polarization plate. The liquid crystal variable phase plate rotates liquid crystal molecules perpendicularly to an element plane by applying a voltage and controls an in-plane phase difference amount.

When the above phase difference amount and the in-plane phase difference amount are collectively defined as an effective phase difference amount, the polarization accessory 15 can control the transmission axis angle if the effective phase difference amount is made variable according to the voltage driving.

The imaging method and the image recording method follow the flowchart in FIG. 3. For the polarization accessory using the liquid crystal variable phase plate, an image captured with a sufficiently small effective phase difference amount of the liquid crystal variable phase plate may be selected as the reference image, or an image captured with the smallest effective phase difference amount of the liquid crystal variable phase plate may be selected. The smaller the effective phase difference amount is, the less coloring of an image in the imaging occurs with the liquid crystal variable phase plate.

A description will now be given of a coloring factor of an image and the effective phase difference amount. When an image is obtained with the polarization accessory 15 using the liquid crystal variable phase plate, coloring of the image that is visually unrecognized by a human eye may occur. This coloring occurs due to the transmission axis angle of the polarization accessory 15 using the liquid crystal variable phase plate determined according to the effective phase difference amount, and due to the presence of a wavelength dispersion in the effective phase difference amount. That is, since the transmission axis angle differs depending on the wavelength, incident light even having the same polarization state may or may not transmit depending on the wavelength, causing the coloring. Since the coloring becomes more conspicuous as the effective phase difference becomes larger, selecting an image captured with a sufficiently small effective phase difference as the reference image is equivalent to selecting an image without coloring.

The sufficiently small effective phase difference amount in acquiring the reference image may be less than 0.1λ, or may be 0.05λ where λ is a center wavelength.

During imaging, the sufficiently small effective phase difference amount set to the first imaging enables the first image to be selected as the reference image.

When an image captured in the reference polarization state is selected as the reference image, the polarization accessory 15 may be disposed so that the direction of the polarization plate is 90°, and the image may be captured with the sufficiently small effective phase difference amount.

The imaging system according to this embodiment provides the camera with the image processing unit and the image recording unit, but the present invention is not limited to this embodiment. A processing apparatus other than the camera may have the image processing unit and the image recording unit. The processing apparatus is, for example, a portable information terminal such as a PC, a smartphone, a tablet terminal, and a notebook PC. The processing apparatus may include an apparatus having an image processing unit (for example, a PC or a smartphone) and an apparatus having an image recording unit (for example, a server).

Second Embodiment

Although having the same configuration as that of the imaging system according to the first embodiment, an imaging system according to this embodiment performs processing different from that of the imaging system according to the first embodiment. This embodiment will discuss differences from the first embodiment.

Figure 5:
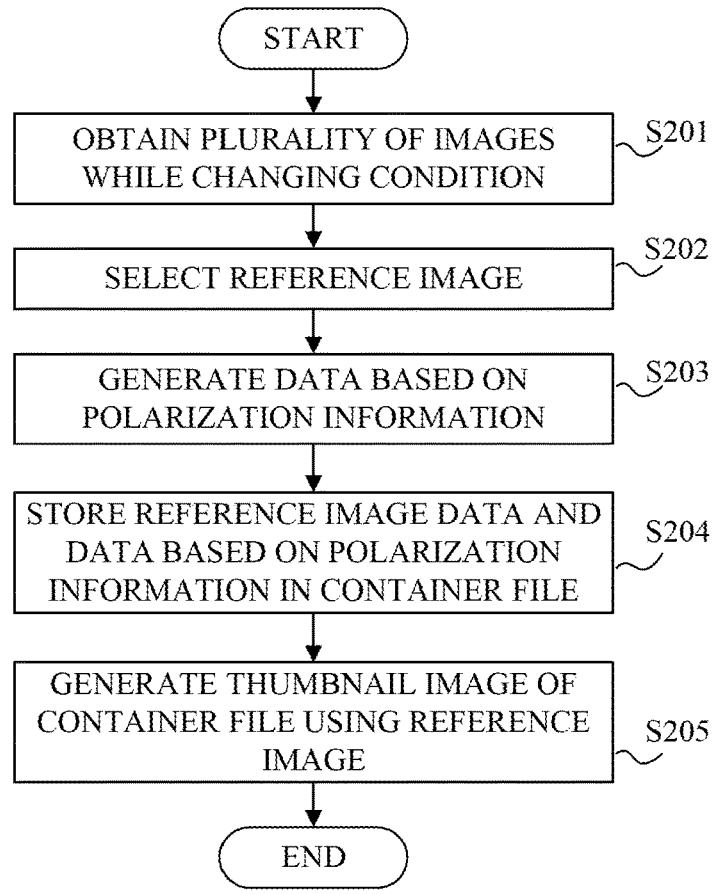
FIG. 5 is a flowchart describing a data recording method according to a second embodiment.

Referring now to FIG. 5, a description will be given of a data recording method executed by the controller according to this embodiment. FIG. 5 is a flowchart describing a data recording method in this embodiment.

In the step S201, the controller rotates a polarization filter of a polarization accessory 11 to make a single-lens camera 21 capture a plurality of images at different transmission axis angles. A memory in the single-lens camera 21 records the plurality of captured images. This embodiment sequentially sets the transmission axis angles of the polarization filter to 0°, 45°, and 90°, and obtains three images.

In the step S202, the controller makes an image processing unit select one reference image from the three images recorded on the memory. In this embodiment, the image processing unit selects an image obtained at a transmission axis angle of 90° as a reference image. The image obtained at the transmission axis angle of 90° corresponds to an image captured in the reference polarization state.

In the step S203, the controller first makes the image processing unit obtain polarization information. Next, the controller makes the image processing unit generate data based on the polarization information.

In this embodiment, the image processing unit calculates a maximum light intensity $I_{max}$ and a minimum light intensity $I_{min}$ for each pixel as polarization information. The maximum light intensity $I_{max}$ and the minimum light intensity $I_{min}$ are the maximum value and the minimum value, respectively, of light intensity $I(\theta)$ relative to the transmission axis angle expressed by the following expression (1).

$$I(\theta)=(I_{max}-I_{min})\cos^2(\theta-\alpha)+I_{min} \quad (1)$$

The image processing unit uses three or more images captured at different transmission axis angles and applies a luminance value at the transmission axis angle θ of each pixel to the expression (1) so as to calculate the maximum light intensity $I_{max}$ and the minimum light intensity $I_{min}$.

In this embodiment, the image processing unit generates, as data based on the polarization information, difference data between the maximum light intensity $I_{max}$ and the minimum light intensity $I_{min}$, and difference data between the reference image and $I_{min}$.

In the step S204, the controller records the reference image data and the data based on the polarization information on one container file in an image recording unit.

In the step S205, the controller makes the image processing unit generate a thumbnail image of the container file using the reference image, and records the thumbnail image in the same file as the reference image data and the data based on the polarization information.

This embodiment records the polarization information obtained from the plurality of images as difference data, and thereby saves a higher recording capacity than that when recording the plurality of images as they are.

Even if any problem occurs in obtaining polarization information, recording one image (or a single image) as the reference image makes it possible to correct errors in the polarization information based on the reference image, or to use the reference image instead of the polarization information.

In this embodiment, the number of images to be obtained is three, and the polarization information includes the maximum light intensity $I_{max}$ and the minimum light intensity $I_{min}$, but the present invention is not limited to this embodiment. Four or more images may be obtained and the other polarization information (for example, a polarization angle α, a degree of linear polarization, a Stokes parameter, etc.) may be obtained.

If four or more images are obtained, or if the obtained polarization information volume is small, the recording method according to this embodiment would make a large capacity reduction effect.

Third Embodiment

Figures 6A, 6B:
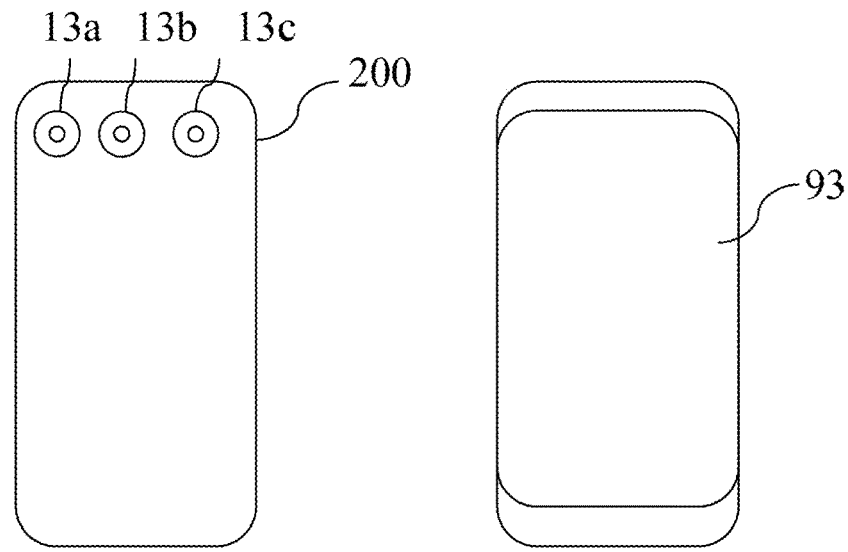
FIGS. 6A and 6B are schematic diagrams of an imaging system according to a third embodiment

FIGS. 6A and 6B are schematic diagrams of a smartphone 200 that is an example of an imaging system according to this embodiment. An imaging system 100C includes the smartphone 200 equipped with a multi-lens camera, as illustrated in FIG. 6A. The smartphone 200 has a memory, an image recording unit, an image processing unit, a controller, and an operation unit. A user makes various settings and operations for the multi-lens camera through the operation unit. The multi-lens camera is composed of three lenses 13a, 13b, and 13c and image sensors. Polarization accessories can be disposed on the lenses 13a, 13b, and 13c and each lens would capture images at different transmission axis angles. In this embodiment, the user can obtain three images simultaneously by setting a multi-lens camera to the polarization acquisition mode and pressing the release button in the operation unit.

The smartphone 200 includes an image display unit 93 illustrated in FIG. 6B and an image editing unit. The user can confirm a captured image and a polarized image on the image display unit 93, and create an image different from the captured image based on the polarization information using the image editing unit, and makes image display unit 93 display the image.

Figure 7A:
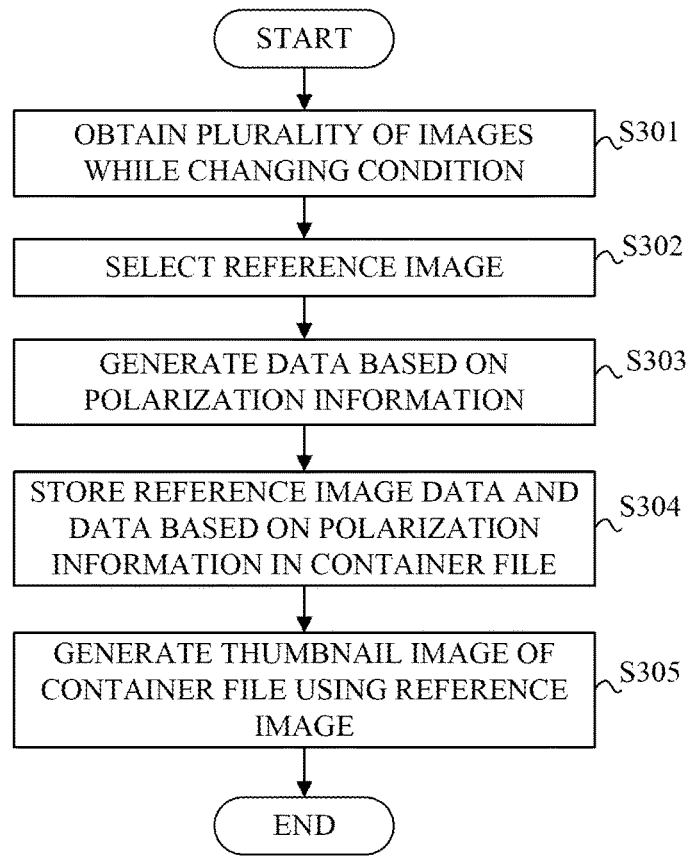
FIG. 7A is a flowchart describing a data recording method according to the third embodiment.

Referring now to FIG. 7A, a description will be given of a data recording method executed by the controller according to this embodiment. FIG. 7A is a flowchart describing the data recording method according to this embodiment. The flow starts when the user sets the multi-lens camera to a polarization acquisition mode and presses the release button in the operation unit.

In the step S301, the controller obtains three images at different transmission axis angles where each image is captured through each lens via each polarization accessory. A memory in the smartphone 200 records these three captured images.

In this embodiment, the polarization accessories include polarization filters having transmission axis angles of 0°, 45°, and 90°, respectively, and provide three images in transmission axis of 0°, 45°, and 90°.

In the step S302, the controller makes the image processing unit select one reference image (single reference image) from the three images recorded on the memory. In this embodiment, the image processing unit selects an image having the lowest luminance as the reference image. Since the image having the low luminance has a small information volume, selecting the image having the low luminance as the reference image would save a recording capacity.

In the step S303, the controller makes the image processing unit obtain polarization information. Thereafter, the controller makes the image processing unit generate data based on the polarization information. In this embodiment, the image processing unit calculates, as the polarization information, a polarization angle α in addition to the maximum light intensity $I_{max}$ and the minimum light intensity $I_{min}$ described in the second embodiment. In this embodiment, the image processing unit generates, as data based on the polarization information, difference data between the maximum light intensity $I_{max}$ and the minimum light intensity $I_{min}$ and difference data between the reference image and the minimum light intensity $I_{min}$.

In the step S304, the controller records the reference image data, the data based on the polarization information, and the polarization angle α on a single container file in the image recording unit.

In the step S305, the controller makes the image processing unit generate a thumbnail image of the container file using the reference image, and records the thumbnail image in the same file as the reference image data, the data based on the polarization information, and the polarization angle α.

Figure 7B:
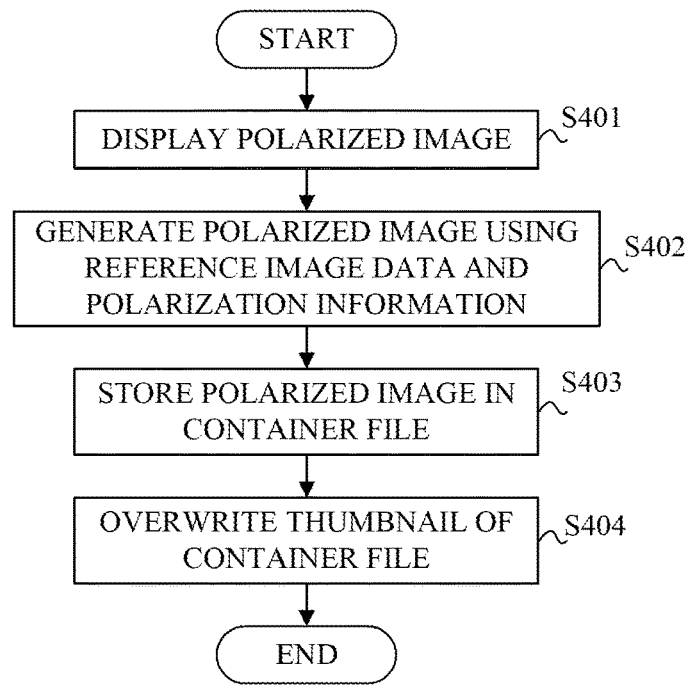
FIG. 7B is a flowchart describing an image editing method according to the third embodiment.

Referring now to FIG. 7B, a description will be given of an image editing method for generating an optimum image executed by the controller according to an instruction from the user. FIG. 7B is a flowchart describing the image editing method according to this embodiment. The flow starts when the user sets the multi-lens camera to the polarization acquisition mode and presses the release button in the operation unit.

In the step S401, the controller displays, on the image display unit 93, a polarized image generated using the polarization information calculated in the step S303 in FIG. 7A. As a polarized image, for example, an $I_{min}$ image in which all the pixels have the minimum light intensity $I_{min}$, or a $(I_{max}+I_{min})/2$ image that is equivalent to a nonpolarized image may be displayed. A polarized image specified by the user in advance may be displayed.

In the step S402, the controller makes the image editing unit generate a polarized image using the reference image and the polarization information based on an instruction from the user. The method of generating the polarized image is not particularly limited. For example, a polarized image having a texture different from that of the captured image can be generated using the maximum light intensity $I_{max}$ and the minimum light intensity $I_{min}$. Where the intensity I of each pixel is expressed by a linear sum $I=k_1 \cdot I_{min}+k_2(I_{max}-I_{min})$, the appearance of the image can be changed by adjusting the coefficients $k_1$ and $k_2$. As the coefficient $k_2$ decreases, an effect of reducing the specular reflection can be obtained. As the coefficient $k_2$ increases, an effect of emphasizing the relief pattern or the texture of the surface can be obtained. As the user changes the coefficient, the image generated using the coefficient is displayed on the image display unit 93 and the user can create a polarized image having a desired texture while viewing the generated image.

In the step S403, the controller records the polarized image generated in the step S403 on the same file as the reference image data, the data based on the polarization information, and the polarization angle α.

In the step S404, the controller generates a thumbnail of the container file in the image processing unit using the polarized image recorded in the step S403, and overwrites the thumbnail image generated in the step S305.

In this embodiment, the smartphone 200 has an image editing unit, but the present invention is not limited to this embodiment. An apparatus different from the smartphone 200 may include an image editing unit.

Figure 8:
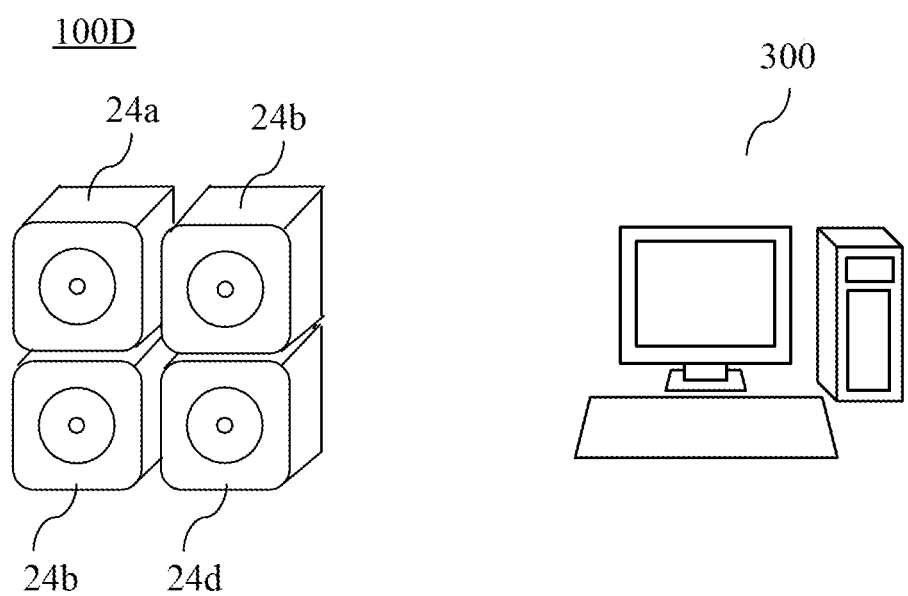
FIG. 8 is a schematic diagram of another imaging system according to the third embodiment.

FIG. 8 is a schematic diagram of another imaging system 100D according to this embodiment. The imaging system 100D is composed of a plurality of small digital cameras 24a to 24d and a PC (processing apparatus) 300. Each of the small digital cameras 24a to 24d has a polarization accessory. Each of the small digital cameras 24a to 24d is configured to obtain one image in different transmission axis, and in total, four images can be obtained.

The imaging system 100D temporarily records data of a plurality of images on a camera or the cloud. At this time, these data may be recorded on a single file.

After obtaining the plurality of images, the PC 300 executes the processing in the steps S302 to S305 in FIG. 7A and the processing in the steps S401 to S404 in FIG. 7B.

Each obtained data may be recorded on each camera or the image recording unit in the PC 300, or may be recorded on the cloud.

In the imaging system 100D, a PC is taken as an example of a processing apparatus, but the present invention is not limited to this embodiment. For example, a portable information terminal such as a smartphone, a tablet terminal, and a notebook PC may be used as the processing apparatus.

The above embodiments can provide a processing apparatus, an imaging apparatus, and an imaging system, each of which can save the data amount of a plurality of images obtained in different polarization states of light from an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036133, filed on Feb. 28, 2019 which is hereby incorporated by reference herein in its entirety.

What is claimed is:

1. A processing apparatus configured to obtain polarization information using a plurality of images each of which is obtained in a different polarization state of light from an object, the processing apparatus comprising:
a processor configured to select one reference image from among the plurality of images and to generate difference data relating to a difference between the reference image and the polarization information; and
a recorder configured to record the reference image and the generated difference data.

2. The processing apparatus according to claim 1, wherein an image other than the reference image is deleted.

3. The processing apparatus according to claim 1, wherein the reference image is an image obtained with the light from the object having a polarization component of a direction vertical to ground among the plurality of images.

4. The processing apparatus according to claim 1, wherein the reference image is a first obtained image among the plurality of images.

5. The processing apparatus according to claim 1, wherein the reference image is an image having the lowest luminance among the plurality of images.

6. The processing apparatus according to claim 1, wherein the reference image is an image obtained in a polarization state that is set when an acquisition condition is determined among the plurality of images.

7. The processing apparatus according to claim 1, wherein the processor generates a thumbnail image using the reference image, and
wherein the thumbnail image is recorded on a same file as data of the reference image and the difference data.

8. The processing apparatus according to claim 1, further comprising a variable phase plate configured to give a phase difference amount to the light from the object and to make the phase difference variable.

9. The processing apparatus according to claim 8, wherein the variable phase plate is a liquid crystal variable phase plate, and
wherein the polarization state is controlled by changing an effective phase difference amount of the liquid crystal variable phase plate through voltage driving.

10. The processing apparatus according to claim 9, wherein the reference image is an image obtained where the effective phase difference amount is 0.1λ or less.

11. The processing apparatus according to claim 10, wherein the reference image is an image obtained where the effective phase difference amount is minimum.

12. The processing apparatus according to claim 1, wherein the processor obtains the polarization information using the plurality of images.

13. The processing apparatus according to claim 1, wherein the processor calculates a minimum light intensity and a maximum light intensity as the polarization information.

14. The processing apparatus according to claim 1, further comprising an image processor configured to generate a polarized image using the reference image and the polarization information,
wherein the recorder records the polarized image on the same file as data of the reference image and the difference data.

15. The processing apparatus according to claim 14, wherein the image processor generates a thumbnail image using the polarized image, and
wherein the recorder records the thumbnail image on the same file as the polarized image.

16. The processing apparatus according to claim 1, wherein the processor calculates a minimum light intensity and a maximum light intensity as the polarization information.

17. The processing apparatus according to claim 16, wherein the processor generates the difference data relating to a difference between the reference image and the minimum light intensity, and generates data relating to a difference between the maximum light intensity and the minimum light intensity.

18. An imaging system comprising:
the processing apparatus according to claim 1; and
an image sensor configured to receive the light from the object and to output the plurality of images.

* * * * *